Nov. 18, 1952     W. H. ARMACOST     2,618,234
SPACING FERRULE FOR BONDING FINS TO TUBES
Filed Jan. 16, 1947
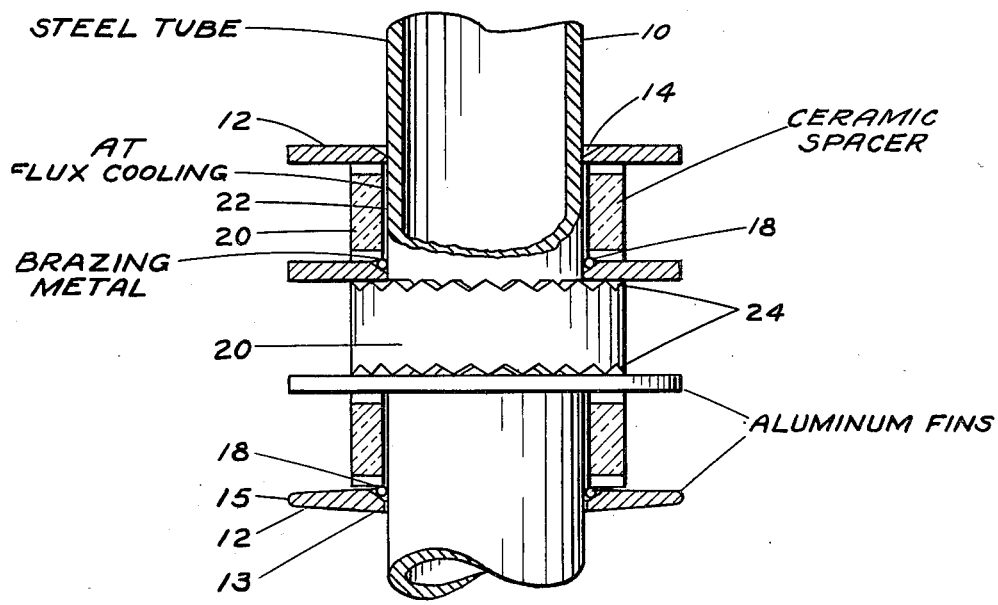
WILBUR H. ARMACOST
INVENTOR Patented Nov. 18, 1952

2,618,234

UNITED STATES PATENT OFFICE 2,618,234

SPACING FERRULE FOR BONDING FINS TO TUBES

Wilbur H. Armacost, Scarsdale, N. Y., assignor to Combustion Engineering-Superheater, Inc., a corporation of Delaware Application January 16, 1947, Serial No. 722,308

2 Claims. (Cl. 113—111)

The present invention relates to an improved method for bonding non-ferrous members to ferrous bodies and particularly to an improved method for brazing aluminum fins to steel tubing and also to a novel ferrule for spacing the fins during the brazing process.

Where a plurality of transverse fins of heat transferring material are to be brazed to a relatively long steel tube of small diameter it is desirable in the interest of expediting the operation to simultaneously apply a plurality of fins to a tube. In doing this some difficulty may be encountered in placing and maintaining the transverse fins in the desired spaced relations axially of the tube and in applying a proper supply of brazing flux and metal for obtaining the bond between the fin and tube.

An object of the present invention is to overcome such difficulties in bonding aluminum fins to steel tubes and it is contemplated to do this by maintaining the fins properly spaced on the tube by ferrules of frangible material which may be removed after the brazing operation and which also are utilized as a vehicle for carrying the brazing flux.

The invention will be best understood upon consideration of the following detailed description of an illustrative embodiment thereof when read in conjunction with the accompanying drawing in which the single figure is a fragmentary elevational view, partly in section, of a tube and fin assembly illustrating the manner in which the present invention is practiced.

The steel tube 10 to which a plurality of transverse fins 12 of aluminum are to be brazed is first thoroughly cleaned on its exterior surfaces which then may be painted with a light coat of an aluminum brazing flux. The aluminum fins 12 may be formed in any desired manner as by stamping from sheet metal or by casting as indicated for the lowermost fin shown. Cast fins have the advantage that they may be made thicker at the root or base 13 than at the peripheral edge 15 so that uniform transfer of heat through the root of the fin to the tube may be attained. However formed, they are provided with centrally located openings 14 of proper diameter so that the fins may fit snugly on the tube surfaces. The edges of the opening are preferably tapered or bevelled from one side of the fin and the concavity thus formed in the upper surface of the fin serves as a repository for a ring or strip 18 of brazing metal. Each transverse fin 12 is maintained properly spaced from the adjacent fins by an annular ferrule 20 of frangible material which may be made, for example, from a proper ceramic material. Prior to assembly with the fins 12 on the tube the ceramic ferrules 20 have a coating 22 of suitable aluminum flux applied to the inner wall surfaces which bounds the central opening therein.

The ceramic collars 20 are serrated as designated at 24 across their upper and lower faces so that when the tube and fin assembly is placed in a brazing oven the heated atmosphere of the latter may have access to the surfaces of the tube 10 particularly in the region where the aluminum fins 12 are to be bonded thereto. The ceramic ferrules 20 while shown of equal height may obviously be of different heights where it is desired to mount the fins in varying spaced relations on a tube.

After mounting the required number of transverse fins 12 with intervening ceramic ferrules 20 and the elements of brazing material 18 on the tube 10, the assembly is placed in a vertical position in an appropriate brazing oven where the metal of the tube and fins and also the brazing material may be heated to the appropriate temperatures so that a good bond may be formed between the fins and tube. A suitable brazing oven and method of brazing are disclosed in the copending application of C. H. True, filed on December 10, 1946, under Serial Number 715,199; therein the exterior surfaces of the tube and the fins thereon are subjected in an oven chamber to a heated reducing atmosphere, such as nitrogen, while superheated steam is simultaneously passed through the interior of the tube to bring it to the brazing temperature.

An advantage of the brazing process described above is that the aluminum fins 12 may be individually brazed to the steel tube 10 without any intervening aluminum connections between adjacent fins, such as the collars projecting from the side face of the fins, as has been the case in certain prior constructions. Where, as disclosed herein, the bond is formed directly between the fin and tube it is possible to eliminate any troubles that might occur due to the different coefficients of expansion of aluminum fins and the steel tube.

What I claim is:

1. As a new article of manufacture a spacer for use when bonding metallic fins in spaced relation to a metallic tube comprising; an annular ferrule of frangible material having a height corresponding to the desired spacing of the fins on the tube and an internal diameter somewhat greater than the latter with a coating of metal bonding flux on the wall surface bounding said opening.

2. A spacing ferrule as recited in claim 1 wherein said ferrule is serrated transversely on at least one end surface.

WILBUR H. ARMACOST.

REFERENCES CITED

The following references are of record in the file of this patent:

UNITED STATES PATENTS

| Number | Name | Date |
|---|---|---|
| 627,366 | Treleaven | June 20, 1899 |
| 1,541,304 | Winholt | June 9, 1925 |
| 1,646,384 | Bergstrom | Oct. 25, 1927 |
| 1,783,285 | Goodwin | Dec. 2, 1930 |
| 1,893,314 | Willets | Jan. 3, 1933 |
| 1,983,347 | Daley | Dec. 4, 1934 |
| 1,990,077 | Kershaw | Feb. 5, 1935 |
| 2,257,643 | Paschke | Sept. 30, 1941 |
| 2,285,811 | Gay | June 9, 1942 |
| 2,369,067 | Mayer | Feb. 6, 1945 |
| 2,396,730 | Whitefield | Mar. 19, 1946 |
| 2,396,795 | Lea | Mar. 19, 1946 |